United States Patent
Carmichael et al.

(10) Patent No.: US 9,668,455 B1
(45) Date of Patent: Jun. 6, 2017

(54) PET FOOD AND WATER BOWLS

(71) Applicants: Raymond Carmichael, Engelwood, CO (US); Linda Carmichael, Engelwood, CO (US)

(72) Inventors: Raymond Carmichael, Engelwood, CO (US); Linda Carmichael, Engelwood, CO (US)

( * ) Notice: Subject to any disclaimer, the term of this patent is extended or adjusted under 35 U.S.C. 154(b) by 120 days.

(21) Appl. No.: 14/804,417

(22) Filed: Jul. 21, 2015

(51) Int. Cl.
*A01K 1/10* (2006.01)
*A01K 5/01* (2006.01)
*A01K 7/00* (2006.01)
*A01K 29/00* (2006.01)

(52) U.S. Cl.
CPC .......... *A01K 5/0114* (2013.01); *A01K 5/0135* (2013.01); *A01K 7/005* (2013.01); *A01K 29/00* (2013.01)

(58) Field of Classification Search
CPC ............................ A01K 5/0114; A01K 5/0128
See application file for complete search history.

(56) References Cited

U.S. PATENT DOCUMENTS

| | | | |
|---|---|---|---|
| D105,450 S | 7/1937 | Clifton | |
| 2,584,301 A | 2/1952 | Sinclair | |
| 3,589,340 A * | 6/1971 | Beliles | A01K 5/01 119/61.54 |
| 5,081,957 A * | 1/1992 | Warner, Jr. | A01K 7/00 119/61.5 |
| 5,269,258 A * | 12/1993 | Brown | A01K 39/01 119/57.9 |
| 5,887,545 A * | 3/1999 | Cuttress | A01K 7/00 119/61.56 |
| 6,311,640 B1* | 11/2001 | Mercado | A01K 5/0114 119/51.01 |
| 6,681,719 B1* | 1/2004 | Warner | A01K 5/0114 119/51.01 |
| 7,320,292 B1 | 1/2008 | Ferrantelli | |
| 7,987,816 B1* | 8/2011 | Walsh | A01K 5/0114 119/61.5 |
| D670,452 S * | 11/2012 | Caruso | D30/130 |
| 2006/0283397 A1* | 12/2006 | Loeffelholz | A01K 5/0114 119/61.56 |
| 2016/0165838 A1* | 6/2016 | Chubeck | A01K 5/0107 119/61.56 |

FOREIGN PATENT DOCUMENTS

CA 2510222 6/2008

* cited by examiner

*Primary Examiner* — Kristen C Hayes
(74) *Attorney, Agent, or Firm* — Kyle A. Fletcher, Esq.

(57) ABSTRACT

The pet food and water bowls is a set of bowls that are positioned on a supporting frame at an elevation that is adapted for use with a pet. The set of bowls each include a handle that is vertically oriented, and affixed to the respective bowl. The handle is concentrically affixed to the respective bowl via a centered aperture. The centered aperture extends upwardly from a bottom bowl surface via a bowl armature. The handle is affixed to the centered aperture, and is adapted to be grabbed via an end user such that the end user does not have to lean over and grasp the respective bowl.

9 Claims, 4 Drawing Sheets

PET FOOD AND WATER BOWLS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

The present invention relates to the field of food and water bowls for pets, more specifically, a set of food and water bowls that include vertical handles that extend to aid an end user in grabbing the water and food bowls without having to lean over.

SUMMARY OF INVENTION

The pet food and water bowls is a set of bowls that are positioned on a supporting frame at an elevation that is adapted for use with a pet. The set of bowls each include a handle that is vertically oriented, and affixed to the respective bowl. The handle is concentrically affixed to the respective bowl via a centered aperture. The centered aperture extends upwardly from a bottom bowl surface via a bowl armature. The handle is affixed to the centered aperture, and is adapted to be grabbed via an end user such that the end user does not have to lean over and grasp the respective bowl.

A primary object of the invention is to provide a set of bowls for pet food and water, which include a handle that extends vertically there from so as to enable an end user the ability to grab the bowl without leaning over.

A further object of the invention is to provide each bowl with a handle that is concentrically oriented as well as vertically oriented.

An even further object of the invention is to provide the handle as an affixture of a centered aperture, which is positioned above the pet food and water.

These together with additional objects, features and advantages of the pet food and water bowls will be readily apparent to those of ordinary skill in the art upon reading the following detailed description of the presently preferred, but nonetheless illustrative, embodiments when taken in conjunction with the accompanying drawings.

In this respect, before explaining the current embodiments of the pet food and water bowls in detail, it is to be understood that the pet food and water bowls is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pet food and water bowls.

It is therefore important that the claims be regarded as including such equivalent construction insofar as they do not depart from the spirit and scope of the pet food and water bowls. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
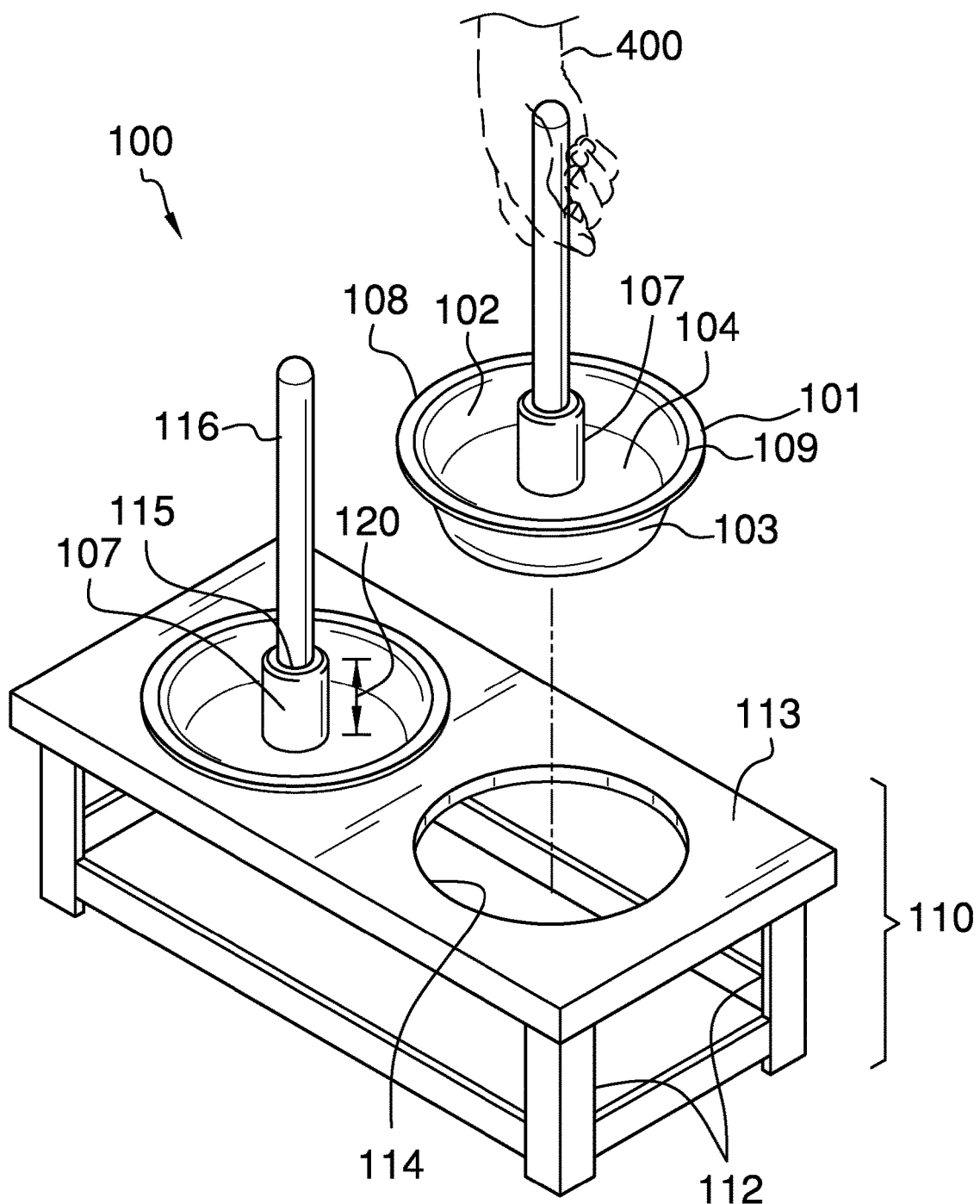
FIG. 1 is a perspective view of an embodiment of the disclosure.
Figure 2:
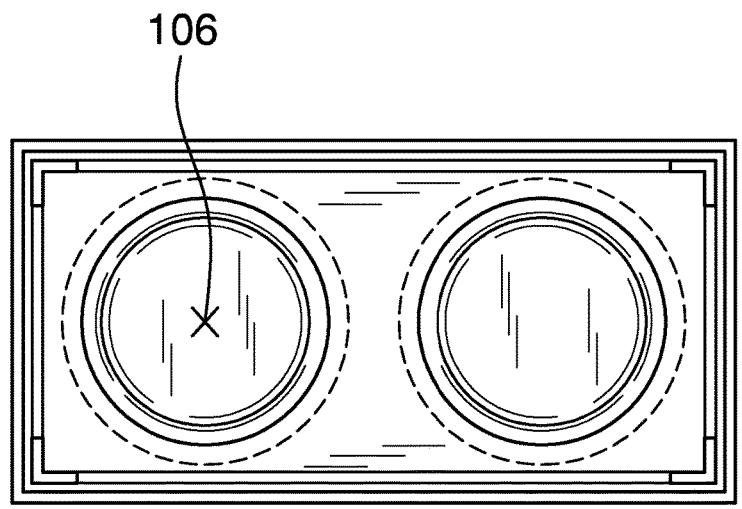
FIG. 2 is a bottom view of an embodiment of the disclosure.
Figure 3:
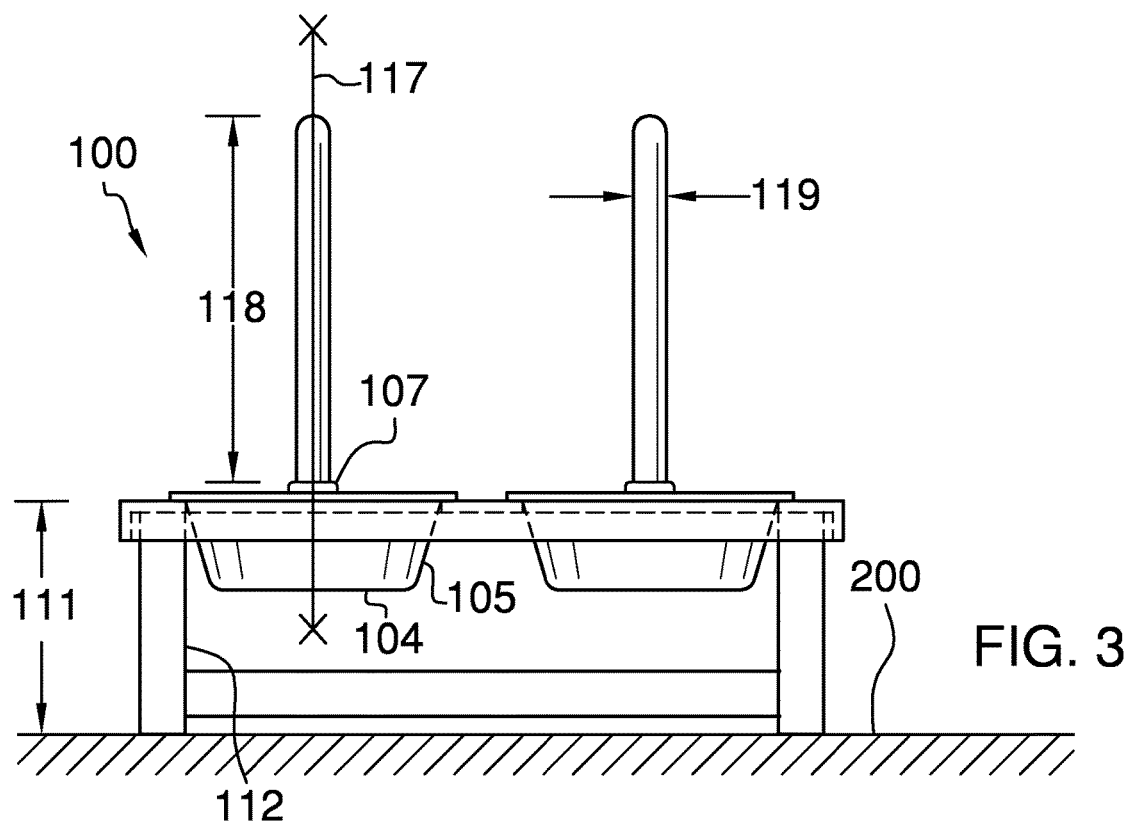
FIG. 3 is a front view of an embodiment of the disclosure.
Figure 4:
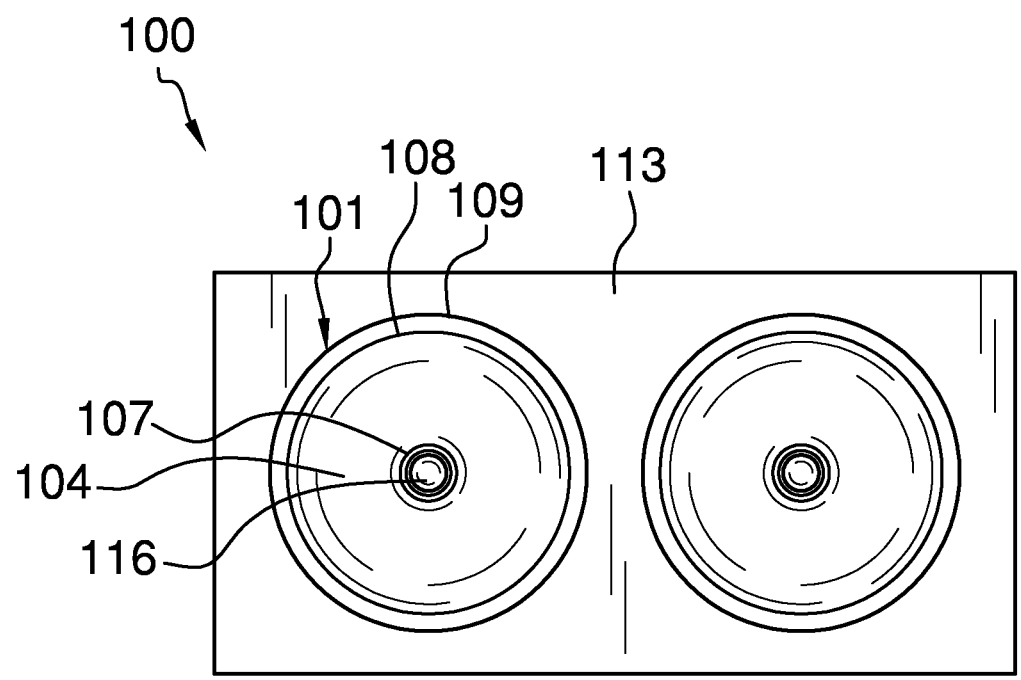
FIG. 4 is a top view of an embodiment of the disclosure.
Figure 5:
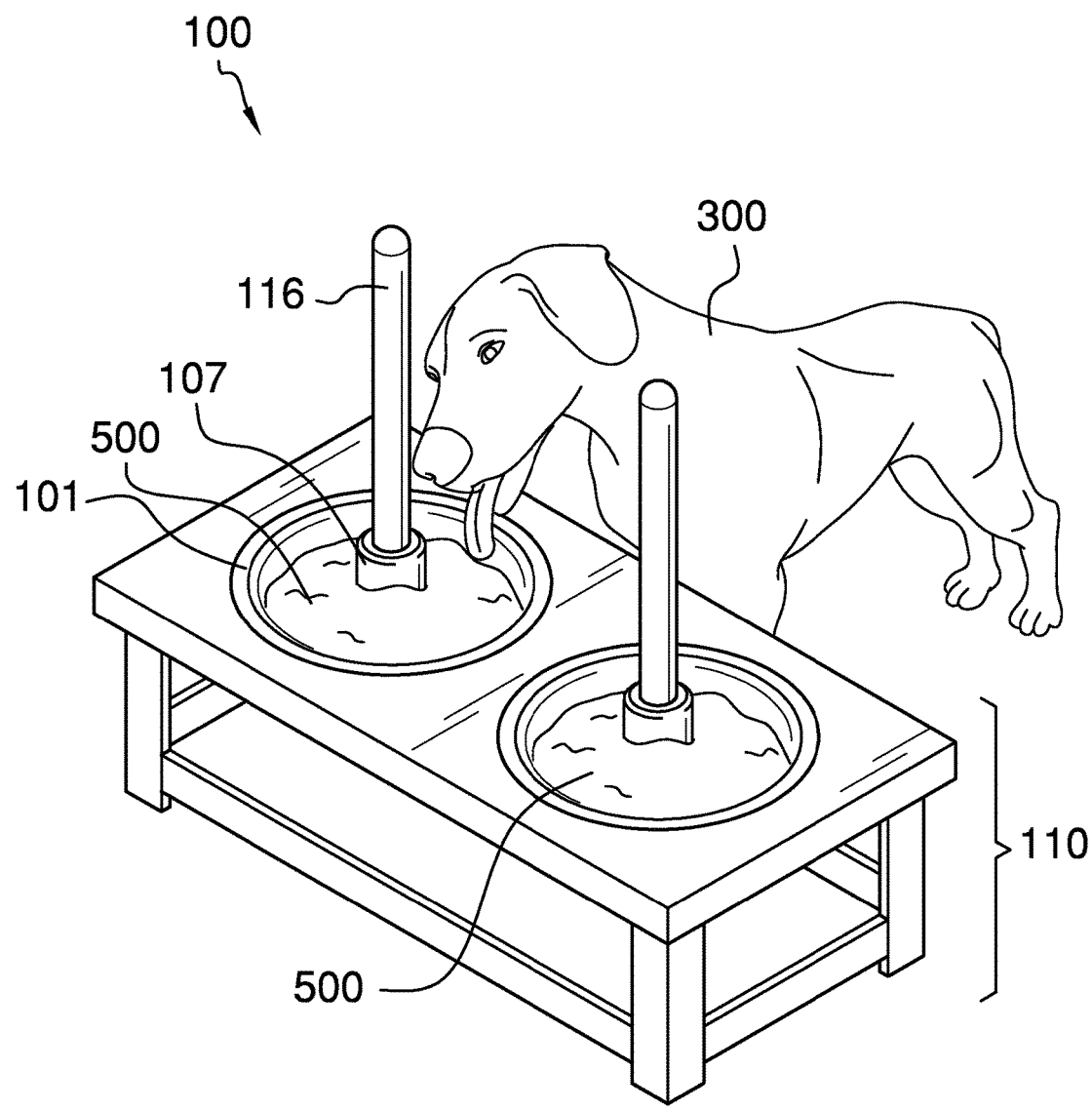
FIG. 5 is another perspective view of an embodiment of the disclosure in use.

Detailed reference will now be made to a first potential embodiment of the disclosure, which is illustrated in FIGS. 1 through 5. The pet food and water bowls 100 (hereinafter invention) comprises a bowl 101 that may be a part of a set, and which is made of a material comprising a wood, metal, plastic, carbon fiber composite, etc.

The bowl 101 is further defined with an inner surface 102, and an outer surface 103. The bowl 101 is circular in shape, and further defined with a bottom bowl surface 104 from which a side bowl surface 105 extends. Located at a center 106 of the bowl 101 is a bowl armature 107. The bowl armature 107 is affixed to the bottom bowl surface 104, and extends vertically there from. The bowl 101 is further defined with a bowl lip 108 that is affixed to the side bowl surface 105 at a top edge 109. The bowl lip 108 extends outwardly from the side bowl surface 105 at the top edge 109. It shall be noted that bowl 101, the bowl armature 107, and the bowl lip 109 are all collectively formed as a single-piece construction. Moreover, the inner surface 102 of the bottom bowl surface 104 and the side bowl surface 105 are adapted to store a food or fluid 500 thereon.

The invention 100 includes a supporting frame 110 that supports the bowl 101 at an elevation 111 above a ground surface 200 in order to enable a pet 300 to consume contents of the bowl 101 at said elevation 111. The supporting frame 110 is further defined with a plurality of legs 112 that support a frame table 113 at the elevation 111. The plurality of legs 112 dictate the elevation 111, which is not less than 2 inches. The frame table 113 includes at least one bowl hole 114 thereon. The bowl 101 is able to be seated on the bowl hole 114 such that the bowl lip 108 rests atop of the frame table 113.

The bowl armature 107 includes a centered aperture 115 from which a handle 116 is affixed. The handle 116 is vertically oriented and extends along a vertical axis 117. The handle 116 is also further defined with a handle length 118 that is not less than 6 inches. The handle 116 is adapted to be grasped via an end user 400 such that the end user 400 does not have to lean over and physically grab or touch the bowl 101. The handle 116 may be further defined as a dowel or bar, which is made of a material comprising wood, plastic, metal, carbon fiber composite, etc. Moreover, the handle 116 has an outer diameter 119 of not less than 0.125 inch.

It shall be noted that the bowl armature 107, the bottom bowl surface 104, and the side bowl surface 105 contain the food or fluid 500 in the bowl 101. Moreover, the handle 116 does not come into contact with the food or fluid 500 in that the handle 116 is located above the bowl lip 108. That being said, the bowl armature 107 extends an armature distance 120 upwardly from the bottom bowl surface 104. The armature distance 120 places the handle aperture 115 above the bowl lip 108.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A pet food and water bowl comprising:
a bowl that includes a handle that extends vertically from a center of said bowl;
wherein the bowl is able to store a food or fluid therein, and which is adapted to be accessed via a pet;
wherein the handle is adapted to be grasped via an end user such that said end user does not need to lean over in order to retrieve the bowl;
wherein the bowl is further defined with an inner surface, and an outer surface;
wherein the bowl is circular in shape, and further defined with a bottom bowl surface from which a side bowl surface extends;
wherein located at the center of the bowl is a bowl armature;
wherein the bowl armature is affixed to the bottom bowl surface, and extends vertically there from;
wherein the bowl is further defined with a bowl lip that is affixed to the side bowl surface at a top edge;
wherein the bowl lip extends outwardly from the side bowl surface at the top edge;
wherein the inner surface of the bottom bowl surface and the side bowl surface are adapted to store the food or fluid thereon;
wherein the bowl armature includes a centered aperture from which the handle is affixed;
wherein the handle is vertically oriented and extends along a vertical axis;
wherein a supporting frame supports the bowl at an elevation above a ground surface in order to enable said pet to consume contents of the bowl at said elevation.

2. The set of pet food and water bowls according to claim 1 wherein the handle is also further defined with a handle length that is not less than 6 inches.

3. The set of pet food and water bowls according to claim 1 wherein the handle has an outer diameter of not less than 0.125 inch.

4. The set of pet food and water bowls according to claim 1 wherein the supporting frame is further defined with a plurality of legs that support a frame table at the elevation.

5. The set of pet food and water bowls according to claim 4 wherein the elevation is not less than 2 inches.

6. The set of pet food and water bowls according to claim 4 wherein the frame table includes at least one bowl hole thereon; wherein the bowl is able to be seated on the bowl hole such that the bowl lip rests atop of the frame table.

7. The set of pet food and water bowls according to claim 6 wherein the handle does not come into contact with the food or fluid in that the handle is located above the bowl lip.

8. The set of pet food and water bowls according to claim 7 wherein the bowl armature extends an armature distance upwardly from the bottom bowl surface; wherein the armature distance places the handle aperture above the bowl lip.

9. The set of pet food and water bowls according to claim 1 wherein the bowl is a set of bowls.

\* \* \* \* \*